No. 736,061. Patented August 11, 1903.

UNITED STATES PATENT OFFICE.

MARC WAHRAM BEYLIK, OF BURBANK, CALIFORNIA, ASSIGNOR TO JOHN M. SHERMAN, OF FREMONT, OHIO.

CETYL-GUAIACYL AND PROCESS OF MAKING SAME.

SPECIFICATION forming part of Letters Patent No. 736,061, dated August 11, 1903.

Application filed October 18, 1901. Serial No. 79,102. (Specimens.)

*To all whom it may concern:*

Be it known that I, MARC WAHRAM BEYLIK, a citizen of the United States, and a resident of Burbank, in the county of Los Angeles and State of California, have invented a new and useful Process of Making Cetyl-Guaiacyl and Products, of which the following is a full, clear, and exact description.

My invention relates to a process for making a new chemical product called "cetyl-guaiacyl," formula $C_{23}H_{40}O_2$, and also to the product of said process.

Cetyl-guaiacyl is a definite chemical composition belonging to the series of phenols. According to the unitary system it represents by constitution the hydrid of guaiacyl, $(C_7H_8O_2,)$ in which the typical hydrogen is displaced by substitution with the alcoholic radical cetyl $C_{16}H_{33}$, the molecular type of guaiacyl, originally oxyphenol or pyrocatechin, $(C_6H_6O_2)$ and converted into $C_7H_8O_2$, exchanging its typical hydrogen for the methyl radical, remains unchanged notwithstanding the progressive substitution caused by the radical cetyl. The substance is thus called rationally "methyl-cetyl-oxyphenol"—a mixed phenol. This substance is formed when a molecule of an alkaline salt of guaiacyl dissolved in absolute alcohol is allowed to react upon a molecule of palmitate of cetyl—that is, upon palmitic ether of cetylic alcohol. A double decomposition will take place, producing an alkaline salt of palmitic acid, leaving behind an alcoholic residual cetyl. The latter substance will simultaneously combine with the phenylic residual guaiacyl, thus forming cetyl-guaiacyl. The palmitic salt being soluble in glycerin will be separated through the agency thereof from cetyl-guaiacyl, which is insoluble in said menstruum, and will be collected on the surface. The cetyl-guaiacyl thus obtained is a highly-refracting fluid at ordinary temperatures. It is lighter than water, faintly odorous, and entirely devoid of the characteristic corrosive pungency of guaiacol. It is insoluble in water, but is soluble in alcohol, ether, chloroform, and the fixed and essential oils. It decomposes at its boiling-point, but can be distilled *in vacuo*. Below 15° centigrade it solidifies into a white mass. It possesses the same medicinal properties as guaiacol, but is without its caustic effect, and it does not irritate the gastro-intestinal parts and secretory organs, even when taken uninterruptedly. By repeated clinical tests conducted by physicians of note its effects have not only proved singularly prompt in every case of morbid affections of organic tissues and the predisposing causes of zymotic disease, but even in cases of purely nervous character. In fact, the cetyl-guaiacyl is unique in its class. Being a diatomic and monobasic phenol, it is endowed with soothing properties rather than with irritating ones. This is the case whether it be applied externally or internally. Applied internally it never disintegrates into its original constituents even under the changed conditions which it encounters from contact with animal life, and no trace of any smell of guaiacol is met with in the urine of users. It is extremely probable that while acting as a medicine it undergoes the phenomenon of oxidation in the system, promoting at the same time that of the nitrogenous aliments and assisting in the assimilation of reparatory ones. This view accounts for the prompt relief and the rapid gain in weight of patients affected by tuberculosis who are submitted to a diet not exceeding thirty minims per diem of this substance.

Having specified the generic characteristics of cetyl-guaiacyl, I will now point out the details of its production for commercial use, the following being practical data: guaiacol, parts by weight, one hundred; sodium, (metal,) parts by weight, twenty-five, (or in case potassium is used, forty-five parts;) spermaceti, parts by weight, six hundred; alcohol, (absolute,) parts by weight, five hundred; glycerin, parts by weight, fifteen hundred. I pour the alcohol into a flask large enough to be filled not more than one-half by it. I cool the flask of alcohol down to at least 4° centigrade by means of an ice-bath. The sodium or potassium, as the case may be, is gradually fed in, small portions at a time, a new portion not being added until the former portions have disappeared. Hydrogen will be evolved, and sodium alcoholate $(C_2H_5NaO)$ will be formed. Upon adding the guaiacol to this compound the original alcohol will be regenerated at the expense of the hydrogen given out by the guaiacol to combine with the sodium, which replaces the hydrogen. The flask is next removed from the ice-bath and allowed to gain the normal temperature—say 25° to 30° centigrade. The contents of the flask, consisting of an alcoholic solution of sodium guaiacyl or potassium guaiacyl, as the case may be, are poured upon spermaceti in a state of fusion. The spermaceti is in a jar inserted in a water-bath heated to about 80° centigrade. The entire contents of the jar are now thoroughly mixed by agitation and allowed to digest until it can be ascertained that the reaction is almost completed. The time required for this purpose is from two to three hours if the process be properly conducted. The jar is now immediately removed from the water-bath in order to prevent secondary reactions forming altered products. The contents of the jar are next incorporated with glycerin, a paddle being preferably used for the purpose. The mixture is now left quiet to allow the gradual separation of the cetyl-guaiacyl, which occupies a stratum at the top. The lower stratum consists of the glycerin and alcohol, holding in solution the larger portion of the palmitate of soda or the palmitate of potassa, as the case may be, these being the by-products of the action of sodium guaiacyl or potassium guaiacyl upon the spermaceti. The glycerin thus impregnated is siphoned off and replaced by the same amount of fresh glycerin heated to 80° centigrade. The contents of the jar are now stirred again by the paddle for the purpose of causing intimate mixture and again set aside. The glycerin is now separated by subsidence. The entire apparatus is now exposed to a temperature of 0° centigrade, and the cetyl-guaiacyl is freed from the palmitate of soda or the palmitate of potassa, as the case may be, and congeals into a white cake on the surface, easy to separate from the bottom layer and easy to remove. The cetyl-guaiacyl thus prepared is contaminated with all the excess of spermaceti, which has undergone no reaction, the excess of cetylic alcohol, (ethal,) and some stearyl-guaiacyl (abbreviated "stiacol") produced collaterally. All these impurities, owing to their melting-point being higher than that of the cetyl-guaiacyl, are conveniently separated either by percolation upon the exposure of the frozen cakes repeatedly to a gradual increase of temperature (method of partial liquefaction) or subjection to powerful compression between the folds of cloths at a temperature of 20° centigrade. In either case the cetyl-guaiacyl portion, being the more fusible, will percolate alone, and the above-named impurities will remain behind in solid form.

In this process the sodium or potassium, as the case may be, and spermaceti are largely in excess of the theoretical proportions; but this excess is a precaution to insure the entire conversion of the guaiacol into cetyl-guaiacyl; otherwise the subsequent removal of any excess of the former is attended with considerable difficulty, while the ultimate separation of other ingredients is easily effected.

Creosote, which is rich in guaiacyl, can be used in place of the latter; but the resulting product will be necessarily of a more or less complex nature.

The by-products can be used for the purpose of recovering certain valuable materials incorporated therein, as follows: All of the glycerin separated by subsidence in the course of the process is collected and treated with perchlorid of iron slightly in excess of the amount needed to convert the alkaline palmitate present in the glycerin into palmitate-salt-of-iron peroxid and sodium chlorid or potassium chlorid, as the case may be. On heating the mixture the iron palmitate being insoluble in glycerin will separate into a soft magma and is easily collected. The residual liquor is then subjected to distillation to recover the alcohol. This being accomplished, the atmospheric pressure within the distilling apparatus is sufficiently reduced to distil over the glycerin unaltered. The palmitate-of-iron peroxid thus obtained is available for medical purposes. Its chemical stability is very great, unlike that of its oleate, which readily suffers rancidity. Its solubility in certain oils renders it fit to mold into capsules and pellets. It is non-astringent. It is an excellent iron preparation, being in many respects superior to any similar preparation in actual use. This has been demonstrated by experiment and by the fact that the demand for the substance is steadily increasing.

Having thus described my invention, I claim as new and desire to secure by Letters Patent—

1. The process herein described for making cetyl-guaiacyl, which consists in causing a reaction to take place between an alcoholate solution of alkaline guaiacyl and spermaceti, then treating the product of the reaction with glycerin to separate the cetyl-guaiacyl from the by-products, and finally purifying the cetyl-guaiacyl.

2. The process herein described for making cetyl-guaiacyl, which consists in cooling absolute alcohol and slowly feeding sodium to the same, thus forming sodium alcoholate $C_2H_5NaO$, then adding guaiacol to this compound, thus forming an alcoholic solution of sodium guaiacyl, then pouring this solution upon fused spermaceti and causing thorough admixture to take place, then digesting the resulting mixture about three hours at a temperature of about 83° centigrade, next incorporating the fluid with glycerin, and then separating the cetyl-guaiacyl from the mixture.

3. The process herein described for making cetyl-guaiacyl, which consists in dissolving alkaline guaiacyl in absolute alcohol at a low temperature, causing the solution thus formed to react upon spermaceti, treating the products of this reaction with glycerin to separate the cetyl-guaiacyl from the by-products, and then purifying the cetyl-guaiacyl.

4. The process herein described for producing cetyl-guaiacyl, which consists in dissolving sodium guaiacyl in absolute alcohol, mixing the solution with spermaceti, applying gentle heat to the mixture for the purpose of stimulating chemical action, and then separating the cetyl-guaiacyl from the by-products and impurities.

5. The herein-described product called cetyl-guaiacyl, a formula of which is $C_{23}H_{40}O_2$, said product being a diatomic and monobasic phenol, lighter than water, soluble in alcohol, ether, chloroform and oils, but insoluble in water and having a melting-point at 15° centigrade.

In testimony whereof I have signed my name to this specification in the presence of two subscribing witnesses.

MARC WAHRAM BEYLIK.

Witnesses:
CHAS. E. PATTERSON,
CHARLES W. FOSTER.